United States Patent
Haas et al.

(10) Patent No.: US 6,820,539 B2
(45) Date of Patent: Nov. 23, 2004

(54) CHARGING DEVICE FOR A BAKING OVEN FOR PRODUCING BAKED MOLDED BODIES

(75) Inventors: Franz Haas, deceased, late of Klosterneuburg (AT); by Johann Haas, legal representative, Klosterneuburg (AT); Fritz Obermaier, Krems (AT)

(73) Assignee: Franz Haas Waffelmaschinen-Industrie Aktiengesellschaft, Vienna (AT)

( * ) Notice: Subject to any disclaimer, the term of this patent is extended or adjusted under 35 U.S.C. 154(b) by 0 days.

(21) Appl. No.: 10/601,546

(22) Filed: Jun. 23, 2003

(65) Prior Publication Data

US 2004/0055476 A1 Mar. 25, 2004

Related U.S. Application Data (63) Continuation of application No. PCT/AT01/00404, filed on Dec. 21, 2001.

(30) Foreign Application Priority Data

Dec. 22, 2000 (AT) .................................. A 2141/2000

(51) Int. Cl.⁷ ............................ A23L 1/00; A47J 37/00; A21C 15/02; A21C 11/00; A21D 8/00
(52) U.S. Cl. ............................ 99/353; 99/355; 99/386; 99/443 C
(58) Field of Search .................. 99/339, 340, 352–355, 99/372–379, 381, 386, 400, 401, 443 R, 443 C, 444–450, 477–479, 483, 467; 126/21 A, 41 R; 219/388, 521, 524; 426/500, 501, 505, 514, 523, 496; 425/335, 363, 471, 305.1, 322, 126.1, 229, 231; 432/59, 72

(56) References Cited

U.S. PATENT DOCUMENTS

| | | | | |
|---|---|---|---|---|
| 4,208,441 A | | 6/1980 | Westover | |
| 4,417,508 A | * | 11/1983 | Haas et al. | 99/355 |
| 4,438,685 A | * | 3/1984 | Haas et al. | 99/342 |
| 4,953,453 A | * | 9/1990 | Haas et al. | 99/373 |
| 5,048,403 A | * | 9/1991 | Haas et al. | 99/355 |
| 5,463,939 A | * | 11/1995 | Koletnik et al. | 99/353 |
| 5,544,570 A | * | 8/1996 | Haas et al. | 99/443 C |
| 5,955,129 A | * | 9/1999 | Haas et al. | 426/231 |
| 5,988,047 A | * | 11/1999 | Haas et al. | 99/353 |
| 6,129,009 A | * | 10/2000 | Haas et al. | 99/353 |
| 6,178,878 B1 | * | 1/2001 | Haas et al. | 99/353 |
| 6,227,103 B1 | * | 5/2001 | Haas et al. | 99/354 |
| 6,575,083 B2 | * | 6/2003 | Haas et al. | 99/353 |

FOREIGN PATENT DOCUMENTS

| | | |
|---|---|---|
| DE | 1 155 736 | 10/1963 |
| DE | 1 932 286 | 1/1971 |
| DE | 2 238 119 | 2/1974 |
| DE | 39 29 443 A1 | 12/1990 |
| EP | 0 879 556 A1 | 11/1998 |
| EP | 1 064 847 A1 | 1/2001 |

* cited by examiner

Primary Examiner—Timothy F. Simone (57) ABSTRACT

A charging device for a baking oven, in which the baking molds that travel through its baking line are formed by the revolving top and bottom baking plates of the oven, whose baking surfaces, which face each other along the baking line, define the top and bottom sides of the molded bodies in the baking molds. The bottom baking plates pass through an input station situated in front of the baking line in a horizontal section of their revolution. The charging device comprises a dough piece setting device in the input station above the path of the bottom baking plates, which is temporarily movable jointly with the bottom baking plates and which sets the dough pieces down at predetermined locations on the baking surfaces of the bottom baking plates.

9 Claims, 6 Drawing Sheets

CHARGING DEVICE FOR A BAKING OVEN FOR PRODUCING BAKED MOLDED BODIES

CROSS-REFERENCE TO RELATED APPLICATION

This application is a continuation of copending International Application No. PCT/AT01/00404, filed Dec. 21, 2001, which designated the United States and which was not published in English.

BACKGROUND OF THE INVENTION

Field of the Invention

The invention relates to a charging mechanism for baking ovens in which the baking molds passing through its baking line are formed by the revolving top and bottom baking plates of the oven, whose baking surfaces, which are positioned facing one another along the baking line, define the top and bottom sides of the molded bodies baked in the baking molds. The bottom baking plates, in a horizontal section of their path of revolution, pass through an input station which is positioned ahead of the baking line, where the charging mechanism, which is disposed at the input station, deposits the batter, i.e. the baking mass, on or in the upwardly facing baking surfaces of the bottom baking plates, before the top baking plates are placed onto the batter (baking masses), and the baking molds are closed.

Baking ovens in which the baking molds passing through their baking line are formed by the revolving top and bottom baking plates of the oven, whose baking surfaces, which are positioned facing one another along the baking line, define the top and bottom sides of the molded bodies baked in the baking molds, are utilized in wafer baking technology for producing crispy, brittle, and easily breakable wafers or soft wafers such as Belgian waffles, depending on the construction of the baking molds and baking plates of the respective oven.

In those ovens, the bottom baking plates pass through a charging station in front of the baking line in a horizontal portion of their path of revolution, where there is a stationary batter pouring device disposed beside the path of the bottom baking plates, which pours the liquid wafer batter onto the passing bottom baking plates in portions adapted to the volume of the respective baking molds. The batter pouring device transports the liquid wafer batter by means of its batter pump from a stock container to its horizontal pouring pipe above the path of the bottom baking plates, whose underside is provided with output openings for the liquid batter. The apportioning of the liquid batter occurs primarily by means of the batter pump of the batter pouring device. There are also known batter pouring devices wherein the apportioning of the liquid batter occurs at the output openings of the pouring pipe by means of valves that are attached there, which are actuated externally.

In those ovens, the liquid batter portion that is poured onto the hot, upwardly facing baking surface of a bottom baking plate flows and spreads out on all sides. In the closing of the baking mold, the hot, downwardly facing baking surface of a top baking plate is placed on the expanded liquid batter portion. The liquid batter portion is frothed by contact with the two hot baking surfaces and distributed to the boundaries of the cavity of the baking mold by the steam emerging within the batter. This gives rise to a batter mass which is not yet stable, and which froths up under the effect of steam and fills the baking mold, which mass will be stabilized in the course of the ongoing baking process, ultimately forming a stable wafer or a waffle that fills the baking mold.

These baking ovens utilize solely liquid batters in which the steam arising from contact with the two hot baking plates is a propellant which loosens up the batter while distributing it to the boundaries of the baking mold cavity. The batter pouring devices of these ovens are unsuitable for charging molds with non-liquid doughs.

SUMMARY OF THE INVENTION

It is accordingly an object of the invention to provide a feed device for placing dough or batter into baking molds in a baking oven which overcomes the above-mentioned disadvantages of the heretofore-known devices and methods of this general type and which provides for a charging device for non-liquid batters that have already been pre-portioned into individual dough pieces, for utilization in ovens in which the baking molds for producing the baked molded bodies are formed by the top and bottom baking plates of the oven, which pass through the baking line of the oven with their baking surfaces facing each other.

With the foregoing and other objects in view there is provided, in accordance with the invention, a combined baking oven and charging device for placing dough into baking molds, comprising:

a plurality of top and bottom baking plates revolve in a longitudinal direction in an elongated oven and together forming the baking molds, the baking molds passing through an elongated baking line in the oven, and the bottom baking plates traversing an input station, prior to entering the baking line, with a horizontal section for the bottom baking plates;

the top and bottom baking plates forming the baking molds having opposing baking surfaces defining top and bottom surfaces of baked molded bodies produced in the baking mold; and a setting device disposed at the input station above the path of the bottom baking plates, the setting device being configured to set dough pieces at predetermined locations onto respective the baking surfaces of the bottom baking plates and to temporarily move jointly with the bottom baking plates.

In other words, the objects of the invention are achieved by a charging device for a baking oven wherein the baking molds passing through its baking line are formed by the revolving top and bottom baking plates of the oven, whose baking surfaces, which are positioned facing one another along the baking line, define the top and bottom sides of the molded bodies baked in the baking molds; whereby the bottom baking plates, in a horizontal section of their path of revolution, pass through an input station which is positioned ahead of the baking line. This charging device is inventively characterized in that it comprises a batter portion setter situated in the input station above the path of the bottom baking plates, which is temporarily movable jointly with the bottom baking plates and which sets the batter portions on the surfaces of the bottom baking plates at predetermined locations.

The charging device according to the invention is particularly suitable in combination and common assembly with the elongated baking oven described and claimed in our commonly assigned, copending patent application No. [attorney docket WEB-39881], published as WO 02/051249 A1, which is herewith incorporated by reference.

The inventive charging device is disposed beneath the discharge station of a transport device that is disposed ahead of the baking oven, which feeds the batter portions thereto. The charging device accepts the batter pieces discharged by the transport device and deposits them on the bottom baking plates at predetermined locations with a time delay.

At the beginning of a movement cycle of the charging device, the setting device is in its rear terminal position beneath the discharge station of the transport device. The setting device remains in its rear terminal position until the batter pieces have exited the transport device and arrived at the setting device. Next, the setting device is moved in synch with the bottom baking plates in the transport direction thereof. After being received by the setting device, the batter pieces wander along the setting device to the predetermined setting locations. There, the batter pieces drop from the setting device and onto the underlying baking surface of a bottom baking plate. The setting device is moved in synch with the bottom baking plates until all batter pieces are released therefrom and every batter piece has arrived at its predetermined setting location on the baking surface of the bottom baking plate. Upon reaching its forward terminal position, the now empty setting device is moved counter to the transport direction of the bottom baking plates back into its rear terminal position, and the next movement cycle of the charging device starts.

With the inventive charging device, the batter pieces are deposited on the bottom baking plates next to one another in the positions predetermined by the setting device.

The setting device can be constructed for a single-row delivery of batter pieces, whereby it accepts only one row of adjacent batter pieces extending transverse to the baking oven per movement cycle of the charging device, which are deposited on the baking surface of a bottom baking plate after migrating through the setting device.

The setting device can also be designed for a double-row delivery of the batter pieces. In this development, in each movement cycle of the charging device, the setting device accepts two rows, situated one behind the other in the longitudinal direction of the oven, of batter pieces that lie adjacent one another in the transverse direction of the oven. The batter pieces of the two rows migrate through the setting device and are deposited on only one bottom baking plate or on two bottom baking plates that are situated one behind the other in the longitudinal direction of the oven.

The setting device can also be designed for multi-row delivery. In this development, three or more transverse rows of dough pieces are accepted by the setting device and deposited on one baking plate or on several baking plates that are configured consecutively in the longitudinal direction of the oven.

The inventive charging device deposits the batter pieces adjacent one another at intervals on the baking surface of a bottom baking plate of the oven. In the oven, in the closing of the baking mold, the appertaining top baking plate is lowered or swung down onto the bottom baking plate. The adjacent batter pieces are thereby flattened by the surface of the top baking plate and pressed apart laterally in the mold cavity defined by the two baking surfaces. During the baking process, the flat batter pieces become individual molded bodies with irregularly defined edges, whose top and bottom sides correspond to the surface regions of the baking surfaces of the top and bottom baking plates which define the relevant molded body above and below, respectively.

With the inventive charging device, it is also possible to charge an oven with batter pieces in such a way that the baking surfaces of the baking plates form several adjacent halves, separated by ridges, of adjacent baking molds. The setting locations that are predetermined by the setting device are then oriented to the bottom halves of the molds, so that the batter piece allocated to each bottom half is set on the bottom baking plate in the respective mold half.

The inventive charging device makes it possible to set identical or different batter pieces on the bottom baking plates. The batter pieces can have the same batter weight but come from different batters or from batters made with different ingredients (coarse sugar, white chocolate pieces, bitter chocolate pieces, fruit pieces, raisins, nut pieces, cheese pieces, etc.). The batter pieces can consist of a solid dough. The batter pieces that are simultaneously set on a bottom baking plate can also have different batter weights.

The batter pieces can also consist of a kneadable yeast dough mixed with sugar pieces, such as the dough utilized for Liege waffles or Belgian waffles. The sugared yeast dough is divided into pieces of equal weight, which are then set aside so that the individual pieces are relaxed by the self-fermenting yeast dough, and their volume is expanded. The dough pieces are set aside in transverse rows on the revolving hangers of a fermentation cabinet. They rise as they pass through the climate controlled interior of the cabinet on the racks. The transit time through the cabinet corresponds to the resting time provided for the dough. At the end of this time, the dough pieces, which have risen but are slightly different, are discharged from the fermentation cabinet, transferred to an inventive charging device, and set down next to one another on the bottom baking plates of an oven by said device. The deposited dough pieces are then simultaneously vertically compressed and horizontally spread out by the top baking plates of the oven. This produces the wafer pattern typical of Liege waffles on the top and bottom of each individual dough piece.

According to another feature of the invention, the setting device can have a slide that can be moved back and forth in the longitudinal direction of the oven, which is provided with receiving trays, arranged adjacently in the transverse direction of the oven, for the dough pieces, whereby each receiving tray is provided with a bottom opening facing the baking surfaces of the bottom baking plates for outputting the dough pieces.

This design facilitates the simultaneous depositing of a large number of dough pieces on one or more bottom baking plates of the respective oven. In the receiving of the dough pieces by the charging device, the slide of the setting device accepts the weight of all the dough pieces hitting the receiving trays and absorbs the impact energy of the dough pieces. The slide then bears the weight of all the dough pieces as they migrate in the respective receiving tray to the bottom output opening under the gravitational force acting on them.

According to another feature of the invention, at least two transverse rows of adjacent receiving trays for the dough pieces can be provided on the slide, with one behind the other in the longitudinal direction of the oven.

This construction allows the parallel depositing of several rows of dough pieces while also extending the time available to each individual dough piece for migrating through the charging device.

According to another feature of the invention, the dough receiving trays that are arranged adjacent one another in the transverse direction of the oven can be fastened to a continuous transport chain that revolves on the slide in the transverse direction of the oven, and a cleaning station for the dough piece receiving trays can be provided in the path of the transport chain beside the path of the bottom baking plates.

This development is advantageous for sticky dough pieces, because the dough particles that remain stuck on the surfaces of the trays through their migration can be removed in the cleaning station before the accumulation of dough particles on the surface of a tray can excessively impede the sliding of the dough pieces on the surface of this tray.

The cleaning station can be arranged beside the path of the bottom baking plates in stationary fashion and can comprise a rinsing device for the receiving trays which is attached to the frame of the oven. Alternatively, a cleaning station that is movable with the slide can be provided, which comprises a rinsing device for the trays that is attached to the slide.

According to another feature of the invention, the path of revolution of the transport chain can comprise two branches extending across the oven in the transverse direction in each of which the receiving trays that are fixed to the transport chain form a row extending in the transverse direction.

This construction allows the parallel depositing of several rows of dough pieces and simultaneously extends the time available to the dough pieces for migrating though the charging device.

According to another feature of the invention, each dough piece receiving tray comprises a funnel-shaped upper part and a sleeve-shaped lower part surrounding its output opening.

This construction is advantageous for dough pieces consisting of a kneadable yeast dough, which rise and subsequently have an easily compressible consistency. These dough pieces change their shape under the effect of gravity alone, both in the release from the transport mechanism positioned ahead of the charging mechanism and in striking the receiving trays of the setting device.

Other features which are considered as characteristic for the invention are set forth in the appended claims.

Although the invention is illustrated and described herein as embodied in a charging device for baking oven for producing baked molded bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawing in detail and first, particularly, to FIGS. 1–6 thereof, there is shown a input or feed station 1 of an elongated oven 2 for producing baked molded bodies. In the oven 2, bottom baking plates 3 and top baking plates 4 revolve in opposite directions (i.e., clockwise and counter-clockwise) on separate paths and pass through the elongated baking line 5 in the same direction with their baking surfaces facing each other. Along the baking path 5, two stacked baking plates 3, 4 form a respective baking mold. The baking mold is also referred to in the art as a pocketed cooking iron formed of an upper iron (4) and a lower iron (3). In each baking mold, the baking surface of the bottom baking plate 3 defines the bottom sides of the. molded body that is baked in the mold, and the baking surface of the top baking plate 4 defines the top sides of the molded body that is baked in the baking mold.

The bottom baking plates 3 and the top baking plates 4, i.e., the lower and upper baking mold halves, are moved through their respective paths of rotation by separate continuous conveyors 6, 7. The path of rotation of the bottom baking plates 3 is arranged below the baking line plane and starts in front of the input station 1. The path of rotation of the top baking plates 4 is arranged above the baking line level and begins behind the input station 1.

At the beginning of the baking line 5, the top baking plates 4 are placed on the bottom baking plates 3 by the upper conveyor 7. This compresses the dough pieces that have been deposited on the bottom baking plates 3 in the input station 1 and traps them in the emerging baking mold between the baking plates 3, 4. The lower conveyor 6 transports the baking molds through the baking line 5. Additional details regarding the processing in and the structure of the baking oven are found in our copending application WEB-39881.

A charging device 8 for the dough pieces is disposed in the input station 1 above the upper horizontal section of the path of revolution of the bottom baking plates 3. This charging device 8 comprises a setting device 9 for the dough pieces. This setting device 9 is temporarily movable jointly with the bottom baking plates 3 and sets the dough pieces on the baking surfaces of the bottom baking plates 3 at predetermined locations.

The discharge station 10 of a fermentation cabinet 11 is arranged above the charging device 8. The fermentation cabinet 11 has two parallel revolving continuous transport chains 12 on which tiltable boards 13 are suspended. A predetermined number of dough pieces are adjacently arranged on the tiltable boards 13. These dough pieces respectively consist of an elastic, kneadable dough which is mixed with a raising agent. The dough pieces spend their rest period, during which the dough rests and the dough pieces rise, on the tiltable boards 13 of the fermentation cabinet 11. The revolving tiltable boards 13 reach the output station 10 of the fermentation cabinet 11 at the end of the resting period. There, two respective adjacent tiltable boards 13 are simultaneously tipped, and the dough pieces 13a that sit next to one another in a row thereon drop down from the fermentation cabinet 11 and into the charging device 8, landing on the setting device 9 therein.

The setting device 9 comprises a carriage or slide 14 above the bottom baking plates 3 of the oven which can be moved back and forth in the longitudinal direction of the oven and which bears receiving trays 15 for the dough pieces 13a, these being arranged adjacently in the transverse direction of the oven. Each receiving tray 15 is provided with a bottom output opening 16 which faces the baking surfaces of the bottom baking plates 3.

The slide 14 sits on guides 17 that extend in the longitudinal direction of the oven 2 and is led thereon so as to be displaceable in the longitudinal direction of the oven 2. These guides 17 are arranged in the oven frame 18 beside the path of the bottom baking plates 3.

Figure 1:
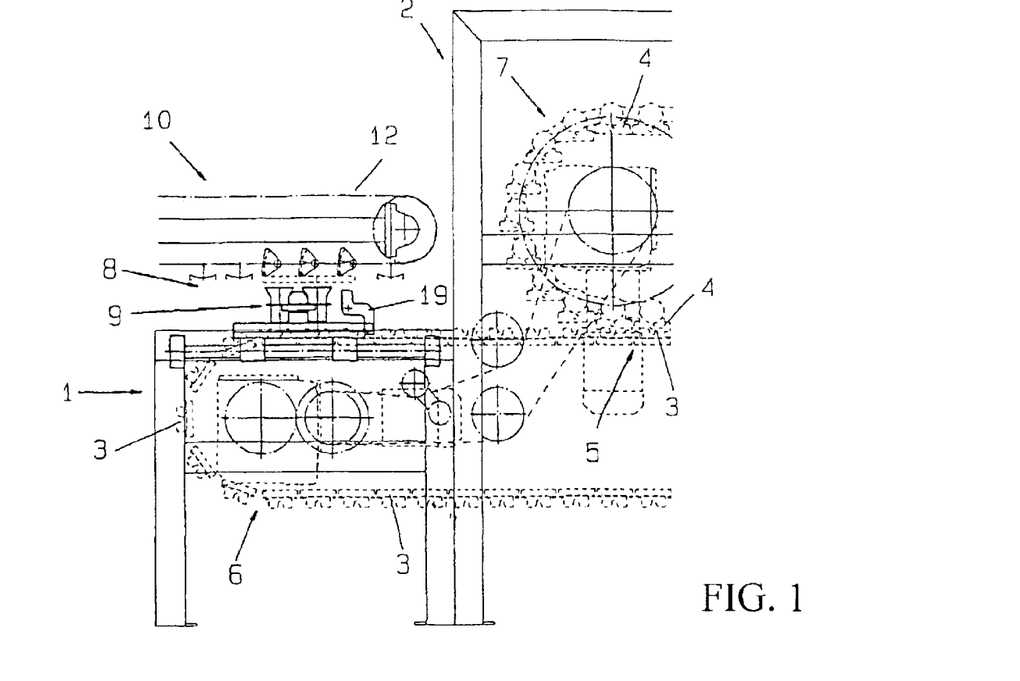
FIG. 1 is a schematic side view of the input station of an oven with a charging device according to the invention at the beginning of a charging cycle.
Figure 2:
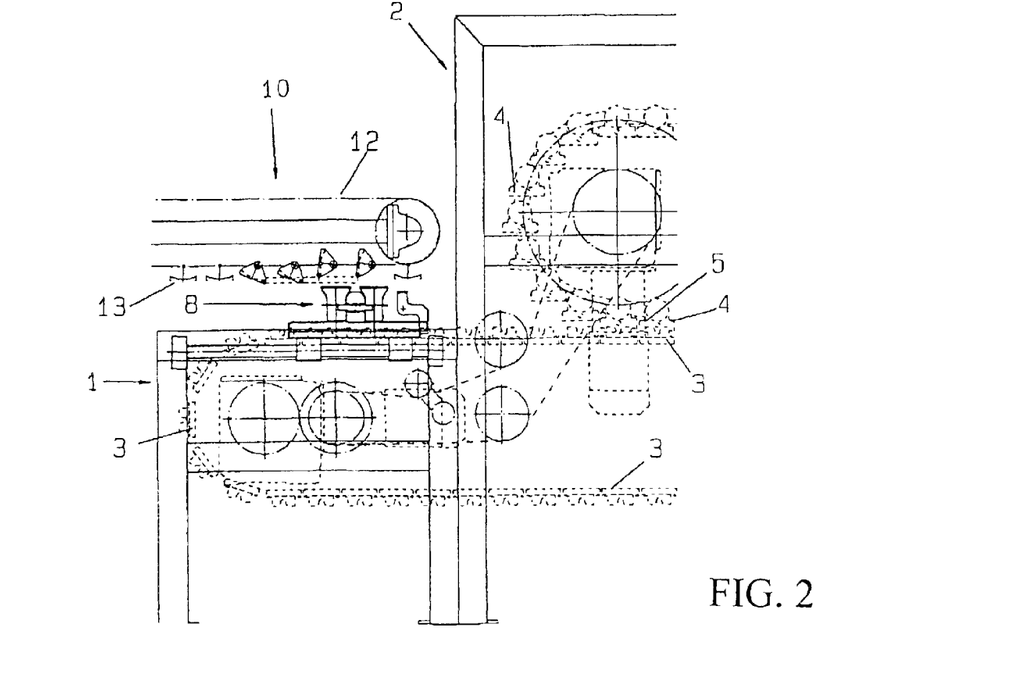
FIG. 2 is a similar view of the input station of the oven, with the charging device at the end of a charging cycle.
Figure 3:
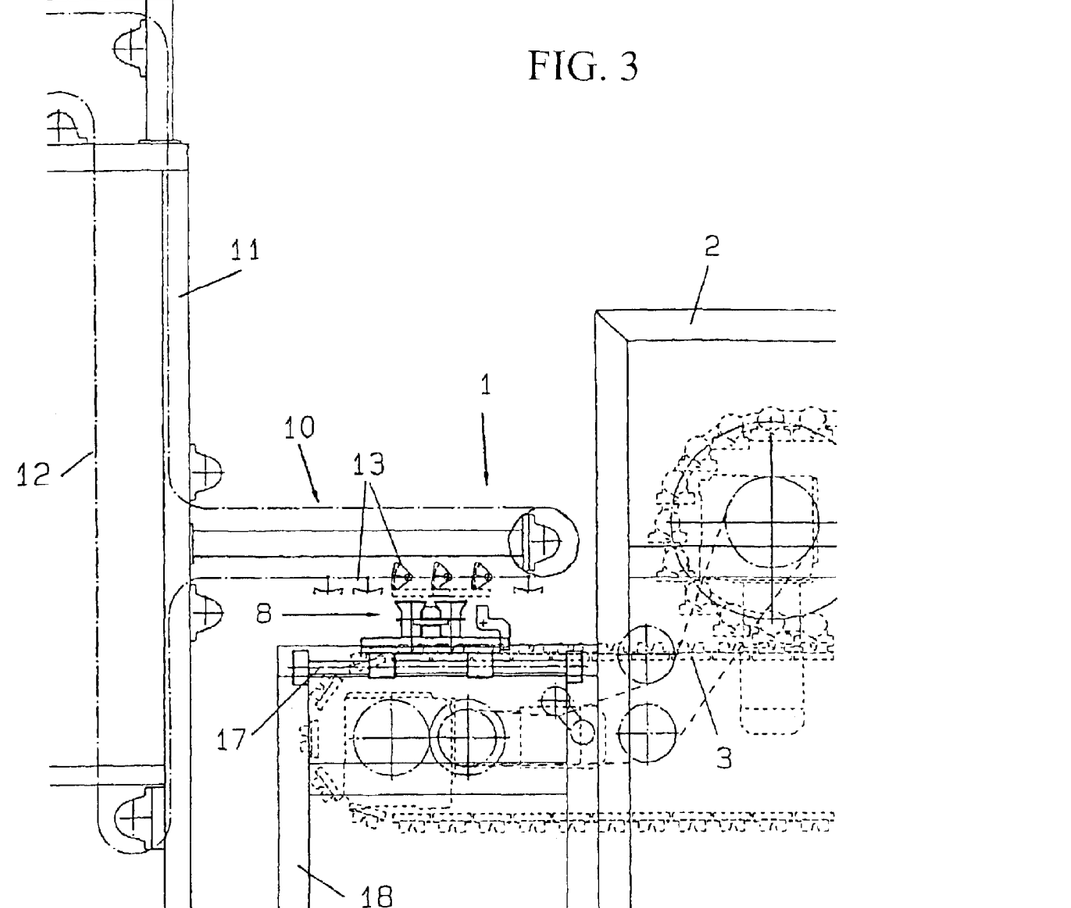
FIG. 3 is a schematic side view of an inventive charging device, which is disposed between the output station of a fermentation cabinet and the input station of an oven.
Figure 4:
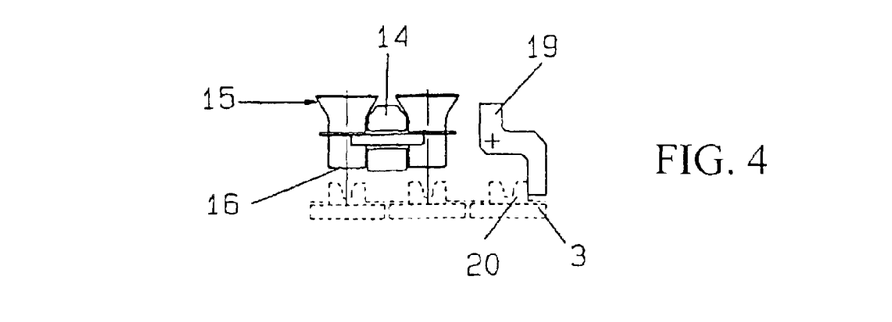
FIG. 4 is a partial view showing a detail of a mechanical coupling of a dough piece setting device with a revolving baking plate line of an oven.
Figure 5:
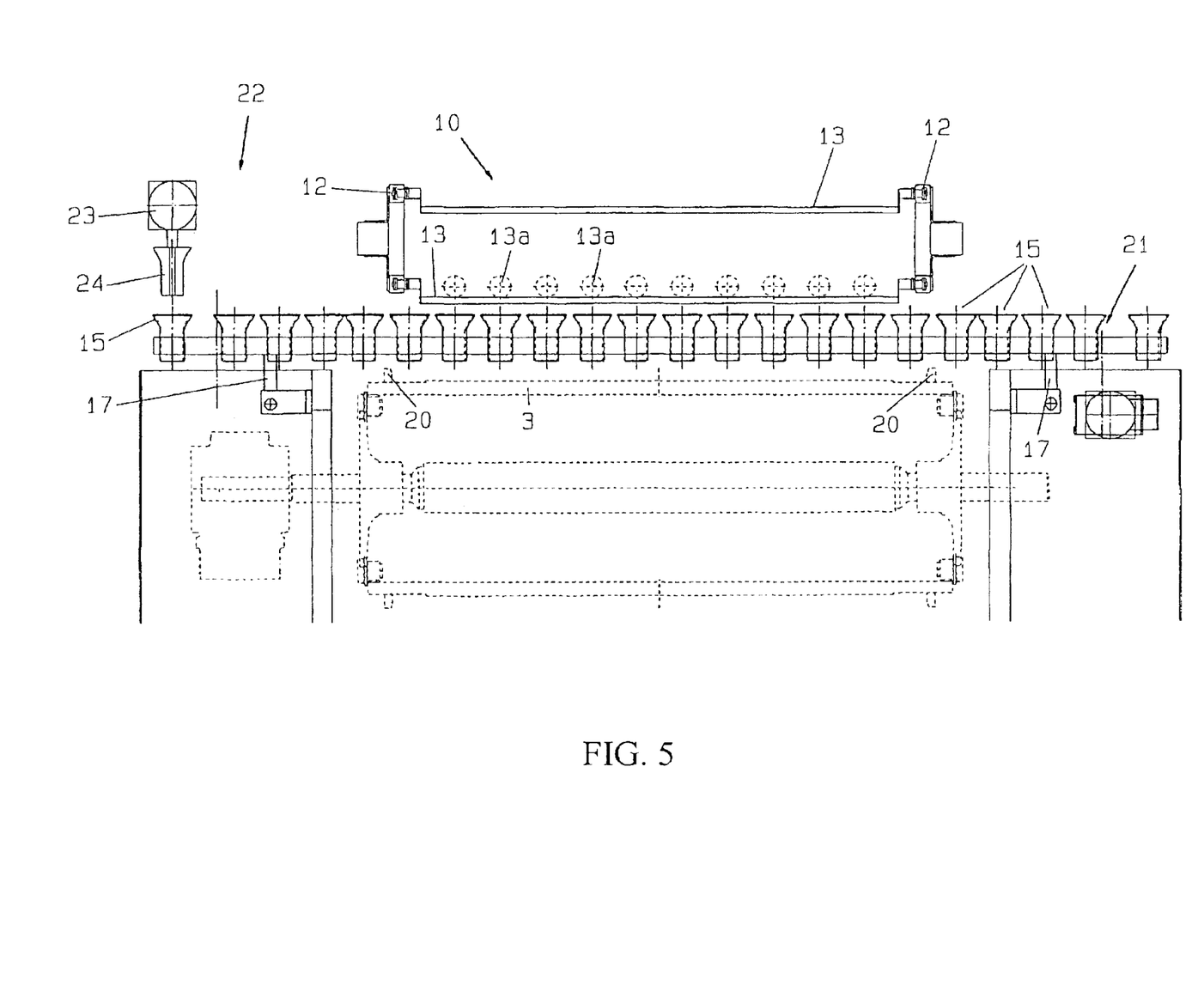
FIG. 5 is a schematic front view of the input station of an oven with an inventive charging device arranged above its bottom baking plate.
Figure 6:
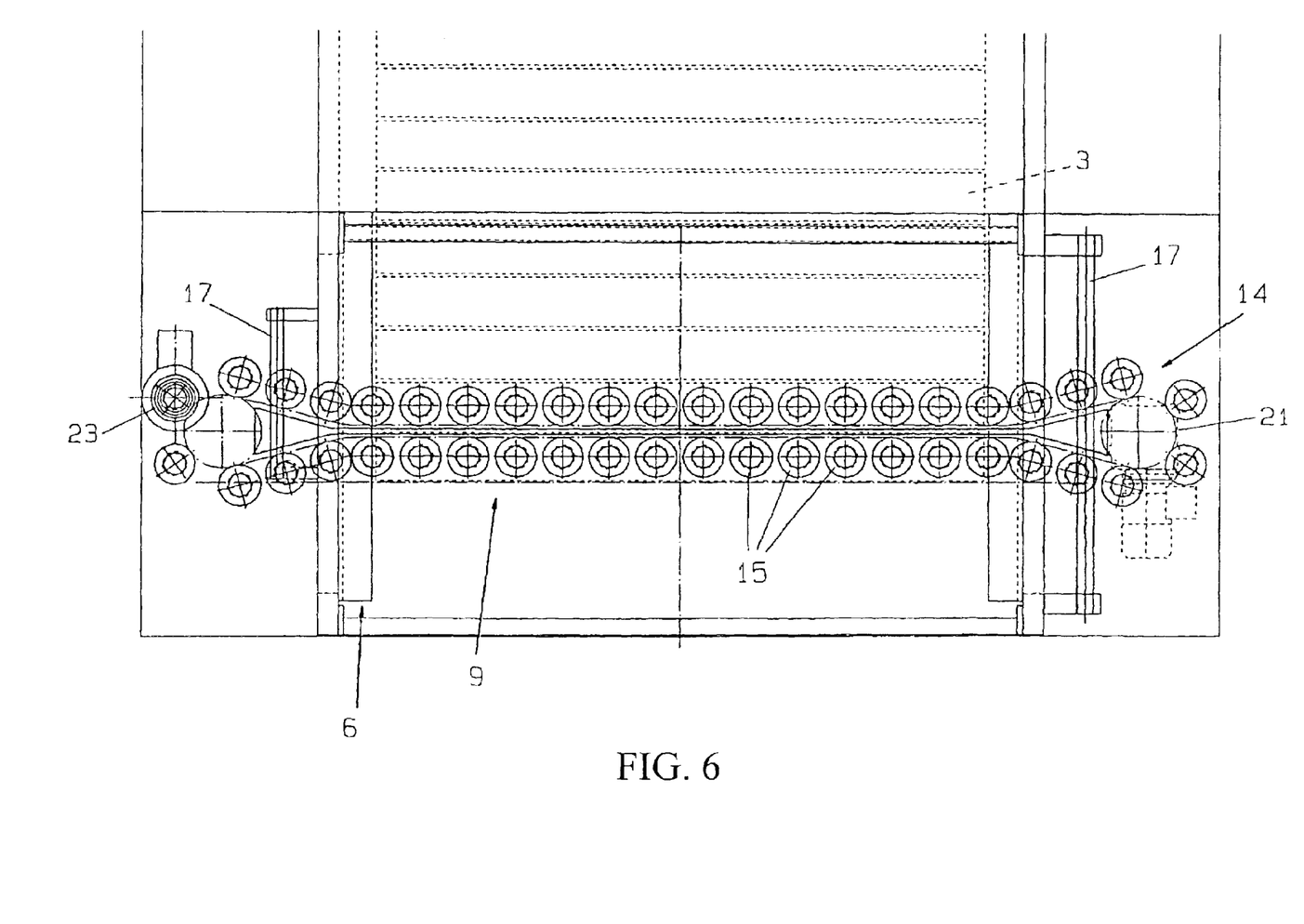
FIG. 6 is a schematic view from above of the input station of the oven represented in FIG. 5.
Figure 7:
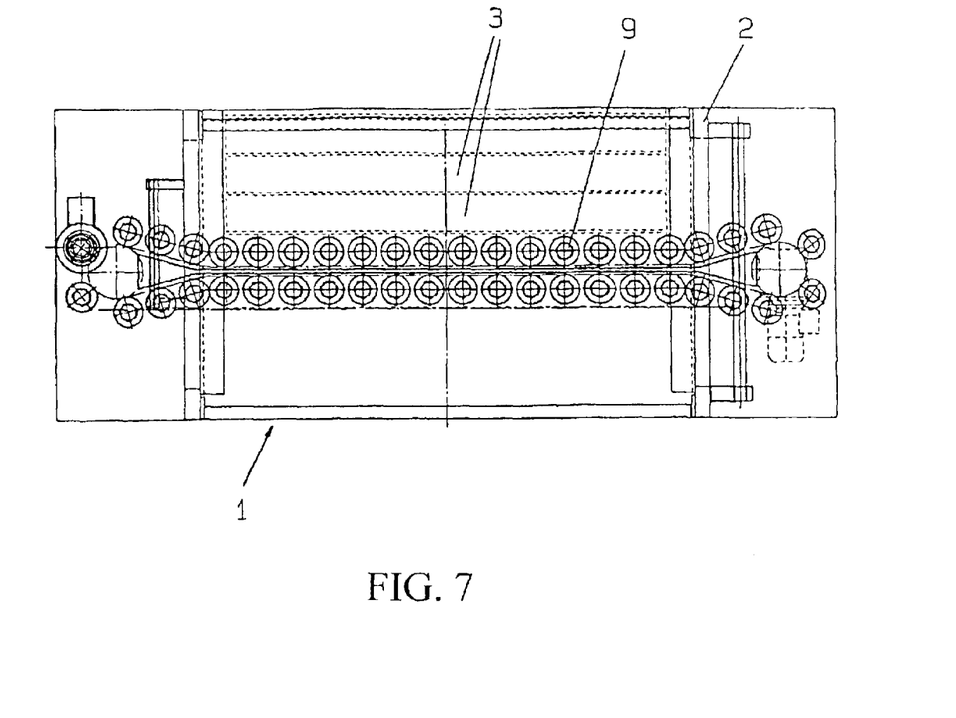
FIG. 7 is a schematic plan view of an input station of an oven with an inventive charging device, with the dough piece setting device in its rear terminal position.
Figure 8:
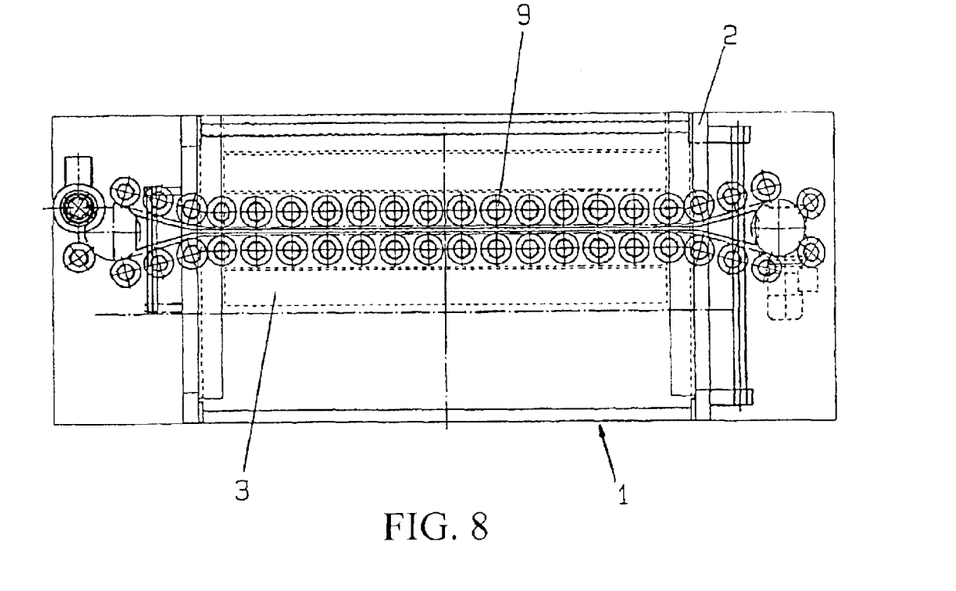
FIG. 8 is a similar view of the input station represented in FIG. 7 with the dough piece setting device in its forward terminal position.
Figure 9:
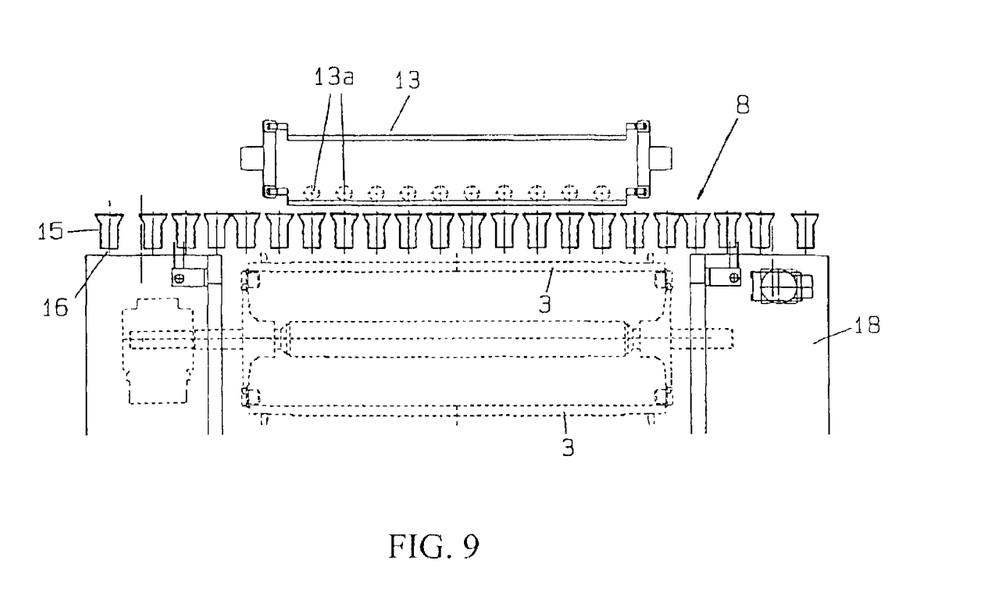
FIG. 9 is a schematic front view of the input station of an oven with a charging device according to the invention disposed above its bottom baking plates and beneath the output station of a fermentation cabinet.

A pivoting dog 19 is provided at the slide 14, which can be engaged with retaining elements 20 that are attached on the side of the bottom baking plates 3, so that the slide 14 can temporarily be moved jointly with the bottom baking plates 3. In the rear terminal position of the slide 14, the dog 19 is lowered and comes in contact with the retaining elements 20, so that the slide 14 is carried by the bottom baking plates 3 in its direction of travel. In the forward position of the slide 14, the dog 19 is pivoted up and lifted off the retaining elements 20 of the bottom baking plates 3. The slide 14 is then moved along the guides 17 in the oven frame 18 back into its rear terminal position by means of a compressed air cylinder which is not represented.

On the slide 14, a continuous transport chain 21 is mounted, which revolves in the transverse direction of the baking oven 2 and is driven by a motor that is arranged beside the path of the baking plates. The receiving trays 15 are fastened to this transport chain 21. A cleaning station 22 for the trays 15 is disposed in the path of revolution of the transport chain 21 beside the path of the bottom baking plates 3. At the cleaning station 22, there is a cleaning device 23, which clears dough residues from the trays 15 and their bottom output openings 16 by means of brushes 24 that move up and down vertically.

The trays 15 have a funnel-shaped top part 25 whose top opening is larger than the dough pieces 13a that are received.

The trays 15 also have a sleeve-shaped lower part 26 which surrounds their bottom output opening 16.

Figure 10:
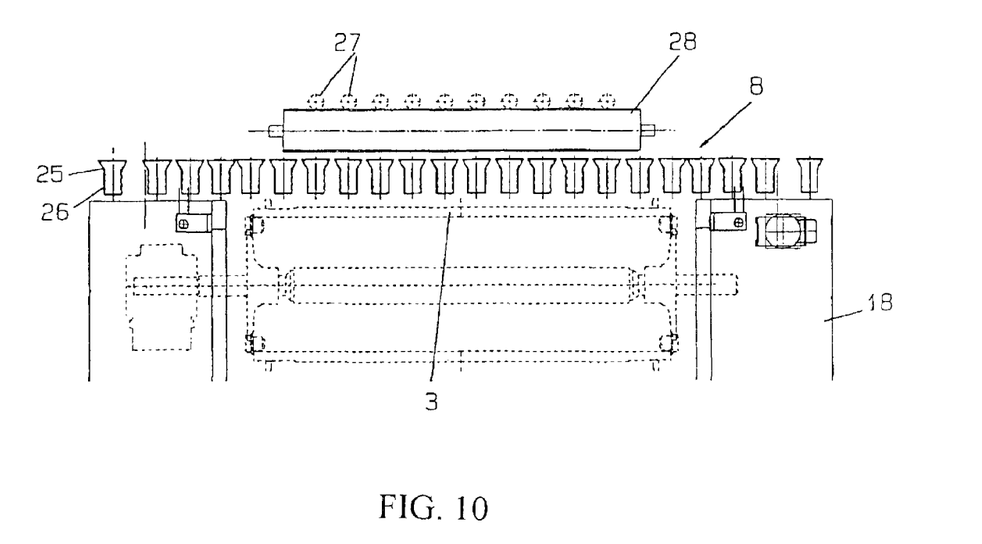
FIG. 10 is a schematic front view of the input station of an oven with a charging device according to the invention above its bottom baking plates and beneath the output end of a continuous transport belt that transports the dough pieces to the oven in consecutive transverse rows.

The dough pieces 27 that are to be set on the baking surfaces of the bottom baking plates 3 can also be fed to the inventive charging device 8 by a conveyor belt 28 that terminates above it (FIG. 10).

The inventive charging device can also be utilized in baking ovens wherein the top and bottom baking plates are received in baking tongs that fold open and closed, which rotate in a self-contained path in the oven and pass through the input station of the oven with their top baking plate folded open more than 90 degrees.

We claim:

1. A combined baking oven and charging device for placing dough in baking molds, comprising:

a plurality of top and bottom baking plates revolving in a longitudinal direction in an elongated oven and together forming the baking molds, the baking molds passing through an elongated baking line in the oven, and said bottom baking plates traversing an input station, prior to entering said baking line, with a horizontal section for said bottom baking plates;

said top and bottom baking plates forming the baking molds having opposing baking surfaces defining top and bottom surfaces of baked molded bodies produced in the baking mold; and a setting device disposed at the input station above the path of said bottom baking plates, said setting device being configured to set dough pieces at predetermined locations onto respective said baking surfaces of said bottom baking plates and to temporarily move jointly with said bottom baking plates.

2. The combination according to claim 1, wherein said setting device comprises a slide movably disposed back and forth in the longitudinal direction, and receiving trays for the dough pieces carried on said slide and disposed adjacent one another in a transverse direction, said trays being formed with bottom output openings facing the baking surfaces of said bottom baking plates for the dough pieces.

3. The combination according to claim 2, wherein each said receiving tray has a funnel-shaped top part and a sleeve-shaped bottom part surrounding said output opening.

4. The combination according to claim 2, wherein said slide carries at least two rows of said receiving trays, said rows extending transversely and being disposed consecutively in the longitudinal direction.

5. The combination according to claim 2, which comprises a transport device for said trays supported on said slide, said transport device comprising a continuous transport chain disposed to revolve on said slide in the transverse direction, and having said trays fastened thereto.

6. The combination according to claim 5, wherein said transport chain carries at least two transverse rows of trays in succession in the longitudinal direction, and said trays are respectively fastened to a section of said transport chain extending in the transverse direction.

7. The combination according to claim 5, wherein said slide has a margin portion protruding laterally beyond a path of said bottom baking plates, and further comprising a cleaning station for said trays disposed in the path of revolution of said transport chain and carried on said margin portion, said cleaning station including a cleaning device for cleaning said trays.

8. The combination according to claim 5, wherein said transport chain carrying said trays includes a section protruding laterally in the transverse direction beyond the path of said bottom baking plates, and further comprising a stationary cleaning station beside the path of said bottom baking plates, said cleaning station including a cleaning device fastened to a frame of said baking oven for said trays.

9. A charging device for a baking oven wherein dough is placed into a baking mold in an input station and the dough is transported within the baking mold along a baking line in the baking oven and cooked to form baked molded bodies, the charging device comprising:

a dough piece setting device in the input station ahead of the baking oven in a transport direction, said dough piece setting device being movably disposed in vicinity of a travel path of a bottom baking plate of the baking mold and configured to temporarily move jointly with the bottom baking plate and to set a dough piece down at a predetermined location on a baking surface of the bottom baking plate.

* * * * *